United States Patent Office 3,115,391
Patented Dec. 24, 1963

3,115,391
METHOD OF PRODUCING TRICALCIUM SILICATE HYDRATE
James P. Leineweber, Somerville, N.J., assignor to Johns-Manville Corporation, New York, N.Y., a corporation of New York
No Drawing. Filed Mar. 22, 1961, Ser. No. 97,456
2 Claims. (Cl. 23—110)

This invention relates to a process for the manufacture of hydrated calcium silicates. More particularly, the invention relates to a process for the manufacture of tricalcium silicate hydrate by a hydrothermal method. The product obtained is very effective as a flatting agent for clear lacquers.

History

Importance in the curing of Portland cements, use in paints, absorption applications and other commercial fields has caused the calcium oxide-silicon dioxide-water system to receive considerable attention in the technical literature during the past several decades. Several different methods have been used to synthesize calcium silicates. Among them, two very different and distinct methods of synthesis are generally followed. The first involves a precipitation reaction wherein a soluble calcium salt, such as calcium chloride, is reacted in water with an alkali silicate such as sodium silicate. The insoluble calcium silicate is formed and precipitates out of the solution.

Several crystallographically different hydrated calcium silicate phases have been prepared by hydrothermal methods of synthesis. Compounds covering calcium oxide to silicon-dioxide ratios of 0.5:3.0 have been produced by the many workers in this field. The hydrothermal reaction involves the high temperature reaction of a silica source such as diatomaceous earth and a calcium oxide source such as lime, in the presence of $H_2O$.

In the art of producing hydrous or hydrated calcium silicates, it has heretofore been the principal aim to obtain a product having a desirable combination of physical properties which would enable the product to serve several purposes. However, such products have been a compromise between the availability of the raw materials, the process of manufacture, and the requirements for the ultimate use. Generally such products have been made from a mixture of raw materials and have consequentially been characterized by a mixture of properties due to a variety of components. For instance, when lime and silica (either amorphous or crystalline) are hydrothermally reacted at a $CaO:SiO_2$ ratio of 3 in the temperature range of 180° C. to 300° C., the thermodynamically stable equilibrium products which are obtained are hillebrandite, with a composition of

and unreacted lime. In this temperature range no stable products have been found which have a $CaO:SiO_2$ ratio of greater than 2. Under certain conditions, however, a compound called tricalcium silicate hydrate,

has been obtained. It is characterized by a distinctive X-ray diffraction pattern and has optical properties that are different from other hydrated calcium silicates.

Several artisans have obtained tricalcium silicate hydrate by the hydrolysis of anhydrous $Ca_3SiO_5$ at temperatures between 150° C. and 500° C. Still others have obtained the compound by reacting lime and silica at $CaO:SiO_2$ ratios on the order of about 3–4:1 and temperatures above 275° C. There is no reported preparation of tricalcium silicate hydrate from lime and silica at temperatures below 275° C.

Objects

It is therefore the primary object of this invention to provide a method of producing tricalcium silicate hydrate in substantially pure form.

It is another object of this invention to provide a method of hydrothermally producing tricalcium silicate hydrate in substantially pure form at a reaction temperature below 275° C.

It is still another object of this invention to provide a method of hydrothermally producing tricalcium silicate hydrate under controlled reaction conditions whereby the production of other hydrated calcium silicates is reduced to a minimum.

It is an additional object of this invention to produce tricalcium silicate hydrate which possesses properties applicable for commercial use.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

Brief Description of Invention

It has now been discovered that synthetic calcium silicates of a predetermined chemical composition may be prepared, possessed of unique physical properties including, among others, the relative freedom from unreacted components or other impurities. In particular I have found that a new calcium silicate may be synthesized from the basic components, silica, lime and water, as a substantially pure chemical compound of uniform characteristics and properties by hydrothermally reacting the constituents at a $CaO:SiO_2$ ratio of 2.7–3.3:1.

Detailed Description of Invention

Work carried out has shown that when lime and silica in the form of diatomaceous earth, are reacted in proportions to give a $CaO:SiO_2$ ratio of 2.7–3.3:1 and temperature ranges of about 180° C. and above, tricalcium silicate hydrate is obtained as the principal reaction product. The product can be obtained with or without the use of mineralizing agents such as sodium fluoride. The use of the mineralizing agents, however, does give a product with a higher degree of crystallization.

The principal feature of this invention is the preparation, in substantially pure form, of the thermodynamically stable phase, tricalcium silicate hydrate, by the direct reaction of lime and silica in a temperature range different from the previously reported range for its formation. A distinct advantage is gained by producing the compound at lower temperatures in that the pressure developed in the reaction vessels is much lower. For example, at a temperature of 280° C., the pressure developed is greater than 1300 pounds per square inch, while at 230° C., the pressure is only 425 pounds per square inch. This pressure differential allows for considerable simplification in the equipment required and consequential lowering of the cost of production.

The reaction conditions most favorable for the formation of the product cover temperatures of about 180° C. and above, with reaction times up to 8 hours. The higher temperatures result in faster reaction rates.

With regard to the reacting constituents, various materials are applicable. For instance, various sources of silica can be used, including diatomite, silica gel, or finely divided crystalline silica. The amorphous types, however, are more satisfactory because of their higher reactivity. To provide the calcium oxide, lime, including quick lime, wet or dry slaked lime, etc., may be used. It is important that the CaO to $SiO_2$ ratio be maintained within the range of 2.7–3.3:1 to avoid contamination by other materials.

As the initial step in the process, the finely divided lime and silica are suspended in at least enough water to form a pumpable slurry. The reactants may be suspended individually or they may be blended before pumping into the reaction vessel. If a mineralizing agent is used, it may be added with either of the components or it may be added separately.

The slurry of lime and silica in the reaction vessel is heated to a temperature of 180° C. or higher and is agitated to obtain a reasonable reaction rate. For instance, at a temperatuer of 232° C., the reaction is completed in less than 2 hours.

The following examples illustrate the instant invention:

*Example I*

A slurry of silica was prepared by mixing finely ground diatomaceous earth with water so that the slurry contained 0.93 pound of solids per gallon. A slurry of hydrated lime was similarly prepared by mixing hydrated lime with water so that the slurry contained the equivalent of 1.39 pounds of CaO per gallon. Two thousand and ten gallons of the diatomaceous earth slurry were pumped into the reactor where it was heated by direct injection of steam. Water was used to flush the feed lines. Then 1868 gallons of the lime slurry were pumped into the reactor, likewise followed by water to flush the lines. The reaction vessel was agitated continually and held at the desired temperature of 232° C. by the injection of steam. The slurry was reacted for 2 hours and 5 minutes at 232° C., and then discharged through a cooling system into an appropriate collecting tank. The solids were filtered from the slurry and then air-dried and ground. The finished product was identified as tricalcium silicate hydrate by X-ray diffraction and had the following physical properties:

Bulk density _____ lb./ft.__ 6.6
Gardner-Coleman water adsorption _____ percent__ 296
pH, 10% slurry _____ 11.5

It should be appreciated that the procedure outlined in Example I in no way limits the process to these particular conditions. Alternative methods of heating and order of addition of the reactants to the reactor can be used. Basically the process requires that the proper amounts of lime and silica be reacted in a water medium at the desired temperature for the required period of time.

The tricalcium silicate hydrate which is produced by the process described in Example I shows good performance as a flatting agent for furniture lacquers. This application is illustrated by Example II.

*Example II*

One hundred grams of tricalcium silicate hydrate prepared by the process described in Example I were mixed with a sufficient quantity of a clear nitrocellulose lacquer base to give 100 g. of vehicular solids. Sufficient lacquer thinner was added to thin the mixture to a viscosity of about 1000 centipoises. This mixture was ground in a ball mill until the tricalcium silicate hydrate had reached a Hegman fineness of 6½. After grinding, sufficient clear lacquer base was added to reduce the amount of tricalcium silicate hydrate to 10% by weight of the lacquer vehicular solids. Sufficient thinner was then added to reduce the flatted lacquer to spraying viscosity (50 centipoises). The formulation was then sprayed on a test panel and dried in the usual manner.

After drying, the film was found to have satisfactory transparency and gave a Gardner 60° specular gloss reading of 14. The untreated lacquer normally gives a reading of between 50 and 60 with a perfect mirror reading being 100.

It is believed the above provides a complete description of the invention in such manner as to distinguish it from other inventions and from what is old, and provides a description of the best mode contemplated of carrying out the invention and thereby complies with the patent statutes.

It is also to be understood that in accordance with further provisions of the patent statutes, variations and modifications of the invention, as illustrated by specific examples herein, may be made without departing from the spirit of the invention. It is to be understood that the scope of the invention is not to be interpreted as limited to the specific embodiments disclosed herein but only in accordance with the appended claims, when read in the light of the foregoing description.

What I claim is:

1. A method of producing substantially pure tricalcium silicate hydrate consisting of reacting under hydrothermal conditions, calcium hydroxide and silica in a mole ratio between 2.7–3.3 to 1 at a temperature between 180° C. and 260° C. for a period of time between 2 and 8 hours to convert hydrothermally the reactants into a reaction product consisting of tricalcium silicate hydrate having a formula $3CaO \cdot SiO_2 \cdot 2H_2O$.

2. A method as described in claim 1 wherein the mole ratio is 3 to 1, the temperature is approximately 230° C. and the time is approximately 2 hours.

References Cited in the file of this patent

UNITED STATES PATENTS 2,361,515      Weidlich _____ Oct. 31, 1944

OTHER REFERENCES

Flint et al.: R.P. 1147, "National Bur. of Stds. J. of Research," vol. 21, pages 617–638, 1938.

McMurdie: R.P. 1560, "National Bur. of Stds. J. of Research," vol. 31, pages 225–228, 1943.

Chem. Abstracts 49, 16381b (1955).

Peppler: "National Bur. of Stds. J. of Research," vol. 54, pp. 205–211, April 1955, R.P. 2582.